United States Patent [19]
Lichtenbelt et al.

[11] Patent Number: 6,072,497
[45] Date of Patent: Jun. 6, 2000

[54] VOLUMETRIC PRE-CLIPPING METHOD THAT GUARANTEES MINIMAL NUMBER OF SAMPLE POINTS THROUGH A VOLUME

[75] Inventors: Barthold Lichtenbelt; Hasan Shahzad Naqvi, both of Ft. Collins, Colo.; Tom Malzbender, Palo Alto, Calif.

[73] Assignee: Hewlett-Packard Company, Palo Alto, Calif.

[21] Appl. No.: 08/866,584

[22] Filed: May 30, 1997

[51] Int. Cl.[7] .......................... G06T 17/00; G06T 15/10; G06T 15/20
[52] U.S. Cl. ............................. 345/424; 345/427
[58] Field of Search ...................... 345/424, 427

[56] References Cited

U.S. PATENT DOCUMENTS

| | | | |
|---|---|---|---|
| 4,958,305 | 9/1990 | Piazza | 345/427 |
| 5,226,113 | 7/1993 | Cline et al. | 345/424 |
| 5,734,384 | 3/1998 | Yanof et al. | 345/424 |

FOREIGN PATENT DOCUMENTS

| | | | |
|---|---|---|---|
| 2231759A | 11/1990 | United Kingdom | G06F 15/70 |
| 2237714A | 5/1991 | United Kingdom | G06F 15/62 |

OTHER PUBLICATIONS

Foley, van Dam, Feiner, & Hughes Computer Graphics, Second Edition, Copyright 1990 pp. 548–51; 700–17; 866–71; 914–15; 1034–39.

Goldwasser & Walsh High Speed Volume Rendering of 3–D Biomedical Data IEEE Eighth Annual Conference of the Engineering in Medicine and Biology Society, Copyright 1986 pp. 1084–87.

Goldwasser Rapid Techniques for the Display and Manipulation of 3–D Biomedical Data National Computer Graphics Association, Copyright 1986 pp. 115–49.

"Computer Graphics: Principles and Practice", Second Edition, Foley et al., Addison–Wesley, p. 237–254, 1990.

*Primary Examiner*—Mark R. Powell
*Assistant Examiner*—Chanté E. Harrison

[57] ABSTRACT

A volumetric pre-clipping method that guarantees only a minimal number of sample points along rays that pass through a volume data set will need to be processed by a volume rendering system. Pre-clipping is a two step process. First, a projection of the volume is made onto an image plane based on the orthographic or perspective view desired. Each bounding vertex of the volume data set is multiplied by the appropriate transformation matrix to transform the vertices from source space to view space. The transformed vertices establish on the view space image plane the projection outline of the volume data set. By definition, only rays cast from pixels on the image plane within this projection outline will pass through the volume data set. Pixels outside the projection outline do not need to be considered. Rays and pixels in view space are transformed back to source space by multiplication with the appropriate inverse transformation matrix for an orthographic or perspective view. Second, for each ray that passes through the volume data set, the entrance point into the volume data set and the exit point out of the volume data set are calculated. Only the sample points along a ray that fall between the entrance and exit points need to be processed by the volume rendering system in order to render the image.

12 Claims, 8 Drawing Sheets

VOLUMETRIC PRE-CLIPPING METHOD THAT GUARANTEES MINIMAL NUMBER OF SAMPLE POINTS THROUGH A VOLUME

CROSS REFERENCE TO RELATED APPLICATIONS

This application is related to application Ser. No. 08/866,859 filed May 30, 1997 entitled Fixed-Point Method for Fast and Precise 3D Spatial Transformations of Shaz Naqvi, Barthold Lichtenbelt, and Russell Huonder, and application Ser. No. 08/865,756 filed May 30, 1997 entitled Ray Transform Method for a Fast Perspective View Volume Rendering of Shaz Naqvi, Russell Huonder, and Barthold Lichtenbelt.

FIELD OF THE INVENTION

This invention relates to computer systems, and more particularly to graphic display of discrete objects within computer systems. Even more particularly, the invention relates to volume rendering for graphic display utilizing a pre-clipping method that produces only sample points in the volume data set for rendering that are on rays that are inside the volume.

BACKGROUND OF THE INVENTION

Volume rendering is an important branch of computer graphics, following behind the development of geometric rendering and pixel rendering. Volume rendering refers to the direct rendering of a volume data set, also referred to as a "volume," to show the characteristics of the interior of a solid object when displayed on a 2D graphics device. A volume data set is a three-dimensional array of voxels. These voxels typically are organized on a regular gridded lattice. Voxels have been defined as sample points separated by a finite distance. Each voxel has a position and a value. The voxel position is a three-tuple specifying an x, y, and z position within the 3D voxel array. The voxel value depends upon its format. For example, a voxel may have an intensity element and an index element. These elements are usually treated differently in the volume rendering process. The collection of values for all points in the volume is called a scalar field of the volume.

Volume data sets can be generated by numerous means, but most commonly by some method of 3D scanning or sampling and by numerical modeling. For example, a volume data set may be generated by Magnetic Resonance Imaging, or MRI, wherein the density of human or animal tissue is computed at each point of a 3D grid. A display of this information could indicate the boundaries of the various types of tissue, as indicated by density changes. Volume rendering is the process of displaying this data on a 2D graphics device.

The coordinate system of the volume is referred to as the source space. The very first voxel in a volume data set in source space has coordinates $(x_o, y_o, z_o)$ wherein $x_o$, $y_o$, and $z_o$ represent the lowermost value of all x, y, and z positions in the volume data set, and is considered to be the origin of the volume data set. Normally the coordinates for this origin voxel are set to (0,0,0). The three coordinates, in order, correspond to the column, row, and slice of the image in the volume data set. The very last voxel in a volume data set is located on the opposite diagonal corner from the origin source voxel of the volume data set. Its coordinates are designated as $(x_u, y_u, z_u)$ wherein $x_u$, $y_u$, and $z_u$ represent the uppermost values of all x, y, and z positions in the volume data set.

Volume data sets can be quite large and thus can place a strain on computer system resources. For example, a typical volume data set from a MRI scanner may contain 6.7 million voxels or more, whereas polygon data sets for geometric rendering typically contain less than ½ million polygons. Thus, there is a much greater need for special purpose hardware acceleration when rendering volumes.

In volume rendering there is often a need to be able to view the rendered image from various projections. The coordinate system of the viewer is referred to as view space or image space. It describes from which direction the volume data set is viewed and rendered. Thus, a key step in the volume rendering process is the 3D spatial volume transformation of the original volume data set from source space to view space. Typical types of transformations required may include zoom, pan, rotation, and even shear of the input volume for projection into an output raster type display device. Once a transformation has been done, various resampling techniques must be applied, such as nearest neighbor or trilinear interpolation, in addition to other steps in the volume rendering pipeline, to determine pixel values for rendering.

A ray is an imaginary line emanating from a pixel on an image plane that passes through the volume. On this ray discrete steps are taken and at each step sample points along the ray are interpolated. Sample points along the ray from the image plane to the volume do not contribute to the rendered image, as well as sample points along the ray after the ray exits the volume. Depending on the view desired by the user, some rays may not pass through the volume at all and thus contribute nothing to the rendered image. Conventional volume rendering implementations typically process all sample points along a ray whether the ray passes through the volume or not or whether the sample points along the ray are within the volume or not. Although possible with software only, to decrease rendering time these implementations often require special hardware solutions to check and keep track of where sample points fall. Thus, much time and system resources are wasted in the rendering process in checking and keeping track of sample points that are not needed for rendering the image. This slows down greatly the rendering process and requires costly expenditures for hardware.

There is a need in the art for an improved method of volume rendering that can eliminate the processing of rays that do not contribute to the final rendered image. There is also a need in the art for a method that does not require hardware solutions and can thus save costly VLSI space. There is a further need in the art for a volume rendering method that only processes the sample points on a ray that actually pass through the volume data set and contribute to the final rendered image. It is thus apparent that there is a need in the art for an improved method of volume rendering which solves the objects of the invention. The present invention meets these needs.

This application is related to application Ser. No. 08/866,859 filed May 30, 1997 entitled Fixed-Point Method for Fast and Precise 3D Spatial Transformations of Shaz Naqvi, Barthold Lichtenbelt, and Russell Huonder, and application Ser. No. 08/865,756 filed May 30, 1997 entitled Ray Transform Method for a Fast Perspective View Volume Rendering of Shaz Naqvi, Russell Huonder, and Barthold Lichtenbelt, which are incorporated herein by reference for all that is disclosed and taught therein.

SUMMARY OF THE INVENTION

It is an aspect of the present invention to utilize a pre-clipping approach to volume rendering that only processes the rays with sample points that contribute to the final rendered image.

It is another aspect of the invention to compute the projection of the volume onto an image plane.

Yet another aspect of the invention is to only process rays cast from the pixels inside the volume projection on an image plane and not process the rays cast from pixels outside of the volume projection on an image plane.

Still another aspect of the invention is to compute the starting position and ending position of each ray through the volume.

A further aspect of the invention is to process only the sample points along a ray through a volume rendering system that are between the starting and ending positions.

The above and other aspects of the invention are accomplished in a volumetric pre-clipping method that guarantees that only the minimal number of sample points through a volume will be processed by a volume rendering system for display on a 2D graphics device. The pre-clipping method employs a two step process. The first step computes the projection, or shadow, of the volume onto the image plane. Only the rays that are cast from the pixels inside this projection or shadow will go through the volume, and thus will contribute to the final image. The rays cast from pixels outside this projection or shadow are clipped and do not have to be considered. The second step computes the starting and ending positions of each ray through the volume. After this is done, the starting and ending positions exactly determine which part of a ray goes through the volume. Thus only sample points on a middle portion of a ray between the starting and ending positions have to be generated and processed through the volume rendering system. The front portion and back portion of sample points are ignored.

In volume rendering a transformation matrix describes how to zoom, pan, rotate, and even shear an input volume for projection into an output raster type display device. In computing the projection of the volume onto an image plane, each of the eight bounding vertices of the volume data set are converted to homogeneous coordinates and are then multiplied by the transformation matrix. This matrix multiplication transforms the eight bounding vertices of the volume data set from source space into view space and into the viewing position from which the user wants to render the volume data set. Since the image plane is two dimensional, the z coordinate of each transformed vertex is ignored, resulting in the projection of the volume data set onto the image plane. Since the eight bounding vertices of a volume data set are the outmost elements of the volume, the above procedure will exactly produce the volume's projection on the image plane.

A ray is then cast from each pixel within the volume's projection or shadow on the image plane to the volume. This ray will intersect the volume, by definition. Calculating the ray direction and the intersection with the volume is a three step process, First, the view vector in source space is obtained. Next, pixels in view space are transformed into source space. Finally, the intersection of rays cast from pixels within the volume projection with the x, y, and z planes of the volume in source space are calculated. The resulting entrance and exit points along each ray are passed to the volume rendering system for processing. Only those sample points along rays fully within the entrance and exit points of the ray are processed by the volume rendering system.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
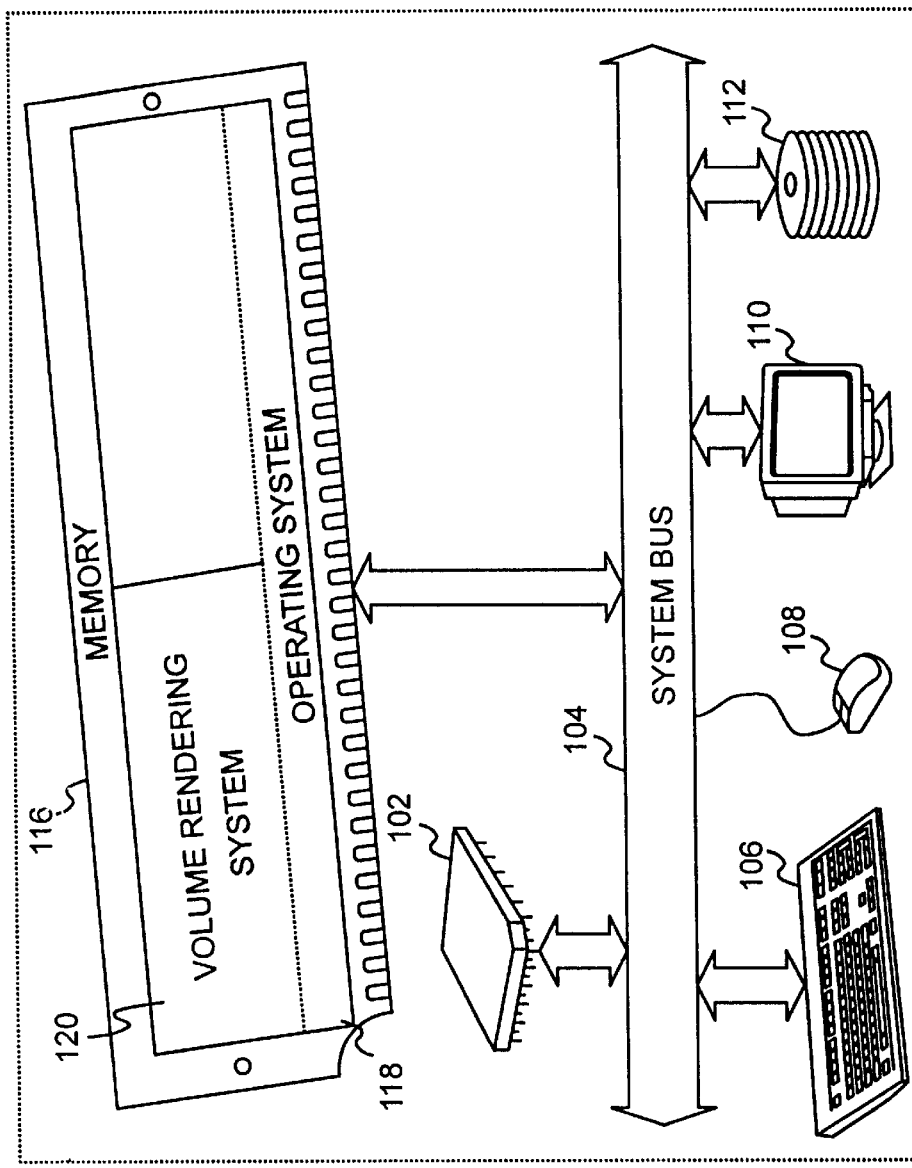
FIG. 1 shows a block diagram of a computer system having a volume rendering system incorporating the present invention.

FIG. 1 shows a block diagram of a computer system containing a volume rendering system incorporating the present invention. Referring now to FIG. 1, a computer system 100 contains a processing element 102. Processing element 102 communicates to other elements of computer system 100 over a system bus 104. A keyboard 106 allows a user to input information into computer system 100 and a graphics display 110 allows computer system 100 to output information to the user. A mouse 108 is also used to input information and a storage device 112 is used to store data and programs within computer system 100. A memory 116, also attached to system bus 104, contains an operating system 118, and a volume rendering system 120 of the present invention.

Figure 2:
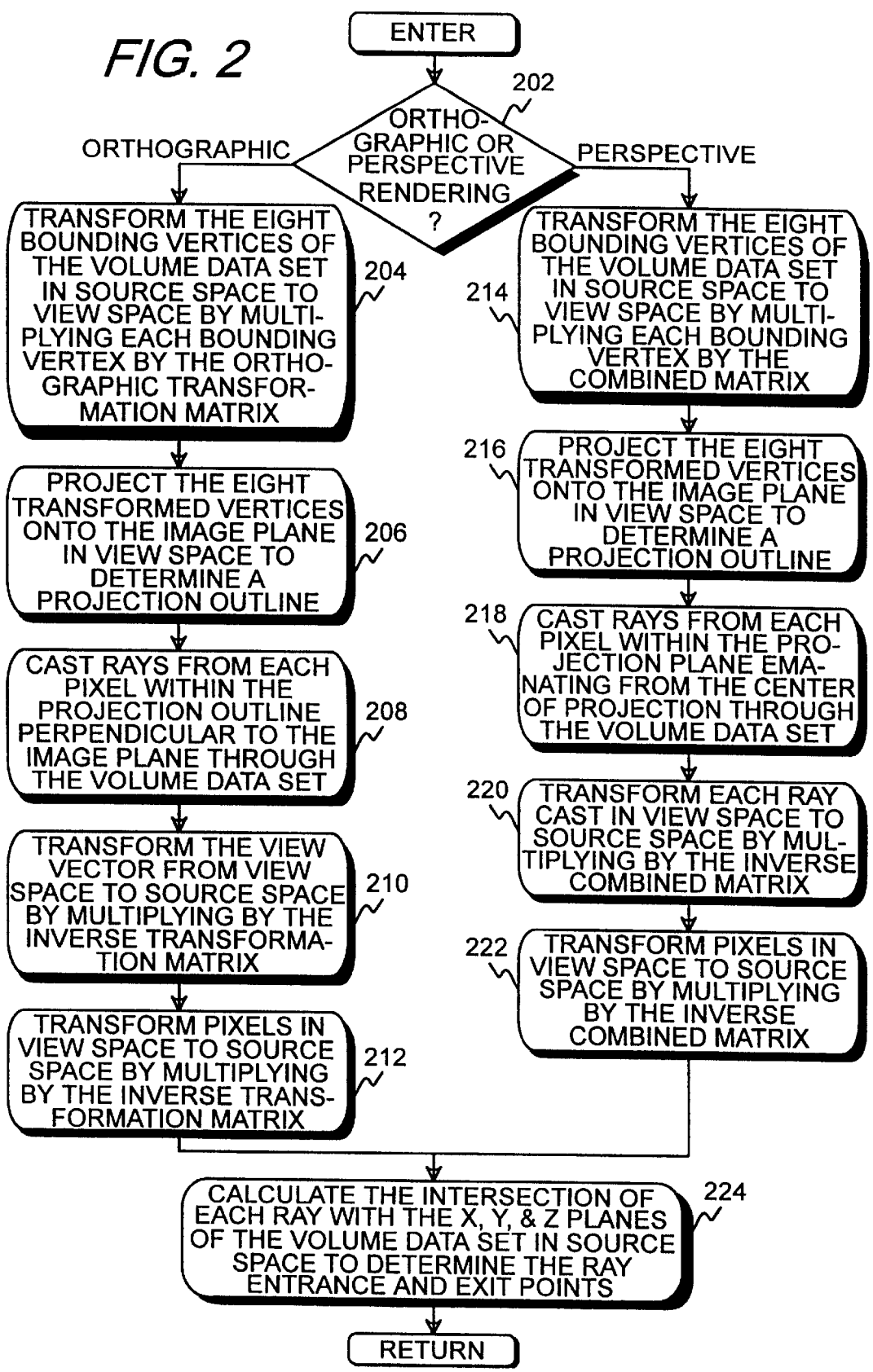
FIG. 2 shows a block diagram of the volumetric pre-clipping method of the present invention.

FIG. 2 shows a block diagram of the volumetric pre-clipping method of the present invention. Referring now to FIG. 2, block 202 determines whether an orthographic or perspective rendering of the volume data set is desired by the user. If an orthographic rendering is desired, then control passes to block 204. Block 204 transforms the eight bounding vertices of the volume data set in source space to view space by multiplying each bounding vertex by the orthographic transformation matrix as more fully explained in the discussion of FIG. 3.

Block 206 uses the view vector for the orthographic view desired to project the eight transformed vertices of the volume data set onto the image plane in view space. This establishes the projection outline of the volume data set onto the image plane as more fully explained in the discussion of FIG. 4. By ignoring the z component of each vertex in view space, each vertex is mapped to the image plane establishing the projection outline.

Figure 4:
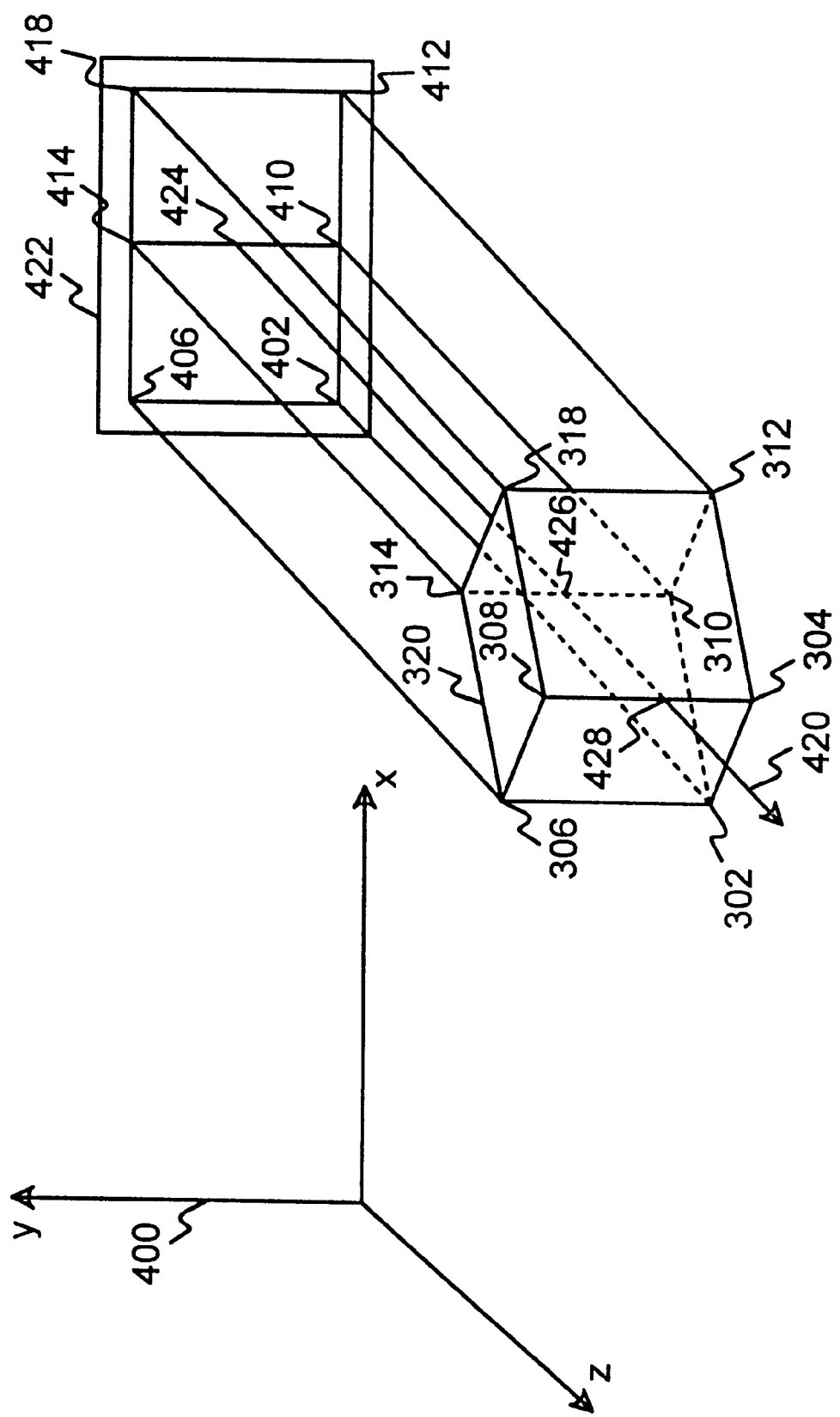
FIG. 4 depicts the volume data set of FIG. 3 that has been transformed into view space with an image plane for an orthographic projection.

In block 208 rays are cast from each pixel within the projection outline parallel to the view vector, which in an orthographic projection is perpendicular to the image plane as more fully explained in the discussion of FIG. 4. By definition, all such rays cast will pass through the volume data set.

Figure 3:
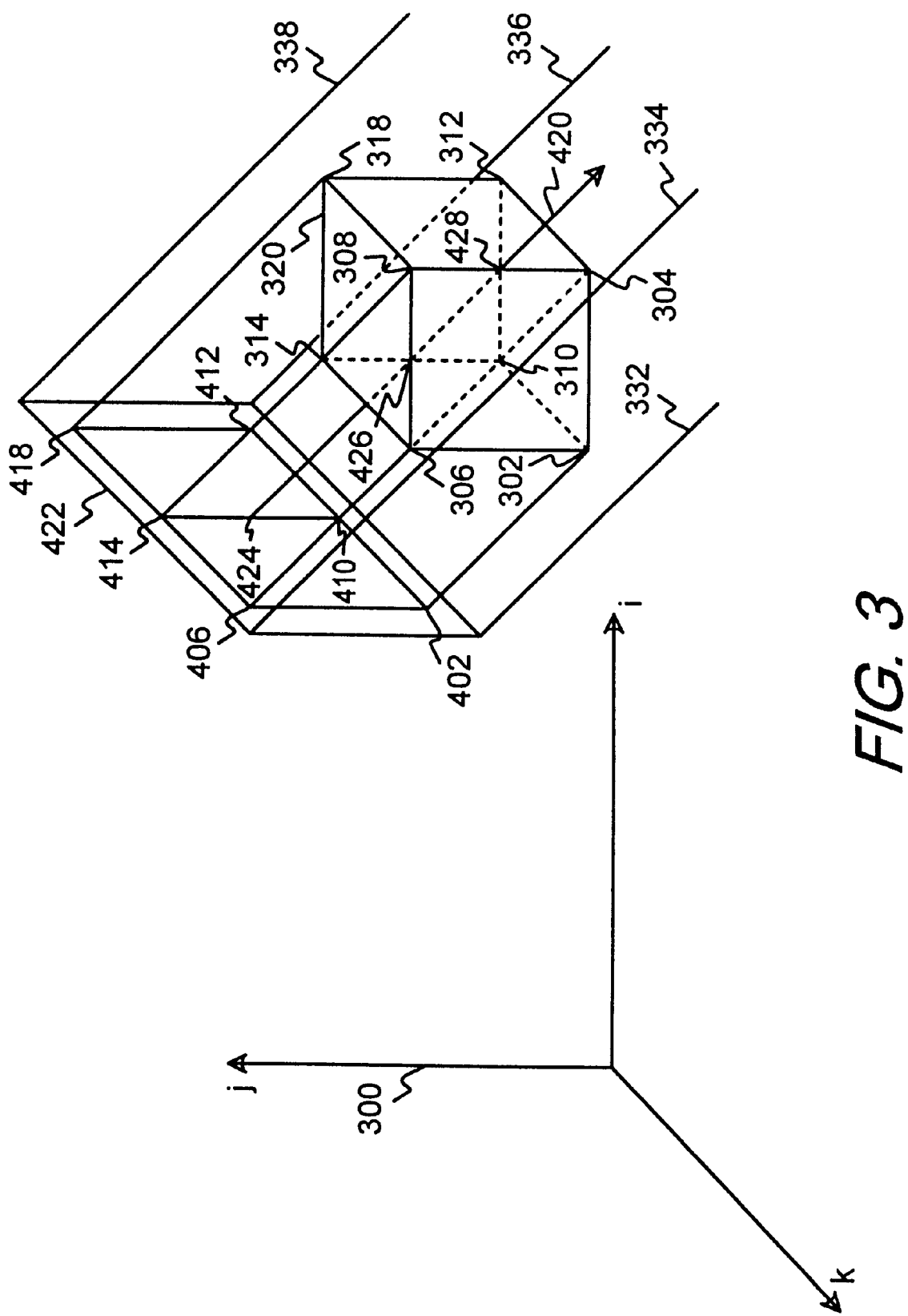
FIG. 3 depicts a volume data set in source space with an image plane for an orthographic projection.

In block 210 the view vector in view space is transformed to source space by multiplying the view vector by the inverse orthographic transformation matrix as more fully explained in the discussion of FIG. 3. Similarly, in block 212 the pixel locations in view space are transformed to source space by multiplying each pixel location by the inverse orthographic transformation matrix as more fully explained in the discussion of FIG. 3. Control then passes to block 224.

If the user desires a perspective rendering in block 202, then control passes to block 214. Block 214 transforms the eight bounding vertices of the volume data set in source space to view space by multiplying each bounding vertex by the combined matrix as more fully explained in the discussion of FIG. 5. The combined matrix is a transformation matrix, derived by multiplying an orthographic model-view matrix by a perspective matrix.

Block 216 uses rays cast from the eye point, or center of projection, for the perspective view desired to the eight transformed vertices to project the eight transformed vertices of the volume data set onto the image plane in view space. This establishes the projection outline of the volume data set onto the image plane as more fully explained in the discussion of FIG. 6. By ignoring the z component of each vertex in view space, each vertex is mapped to the image plane establishing the projection outline.

Figure 6:
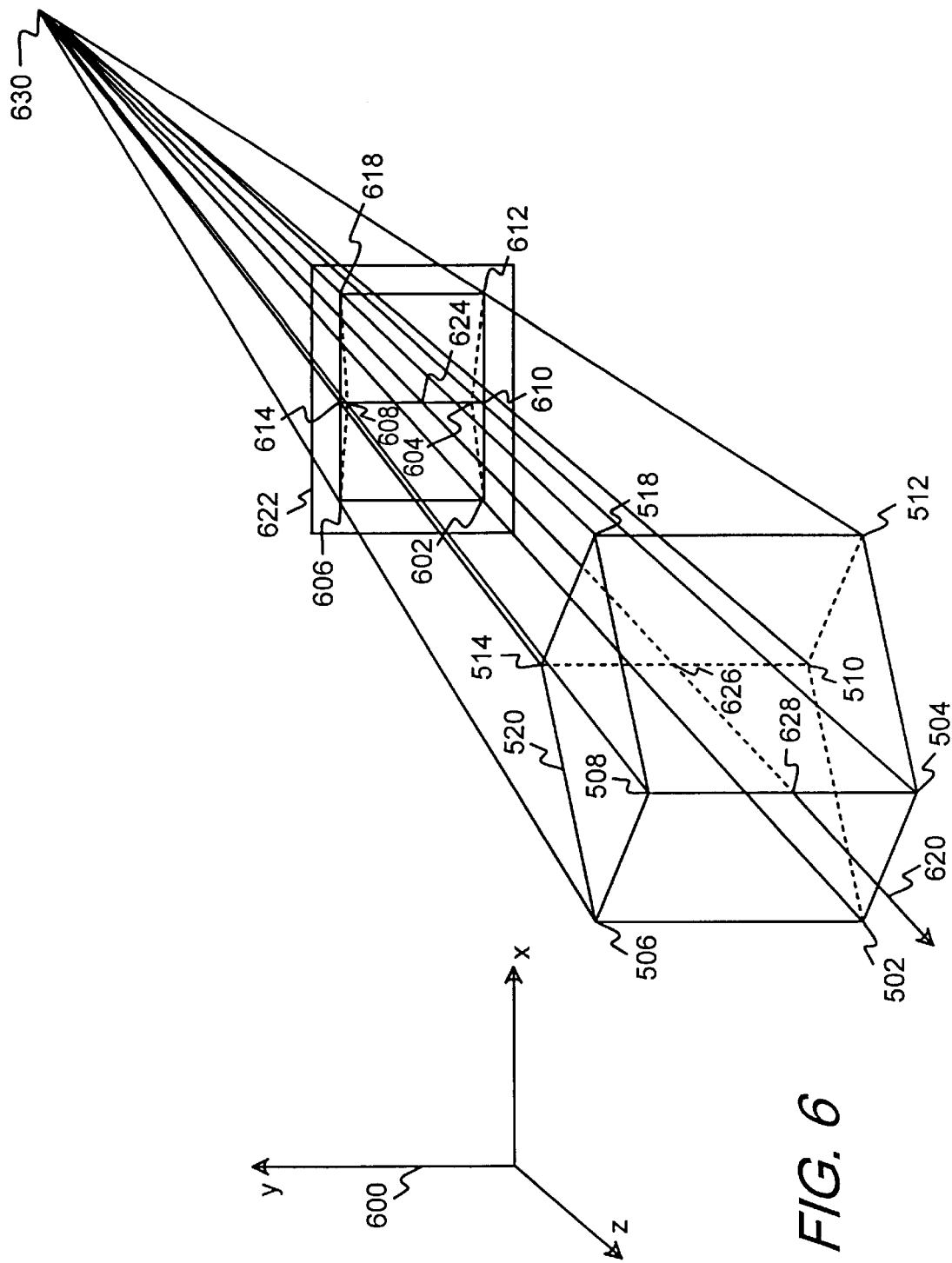
FIG. 6 depicts the volume data set of FIG. 5 that has been transformed into view space with an image plane for a perspective projection.

In block 218 rays are cast from each pixel within the projection outline through the volume data set as more fully explained in the discussion of FIG. 6. The rays emanate from the eye point, or center of projection. By definition, all such rays cast will pass through the volume data set.

Figure 5:
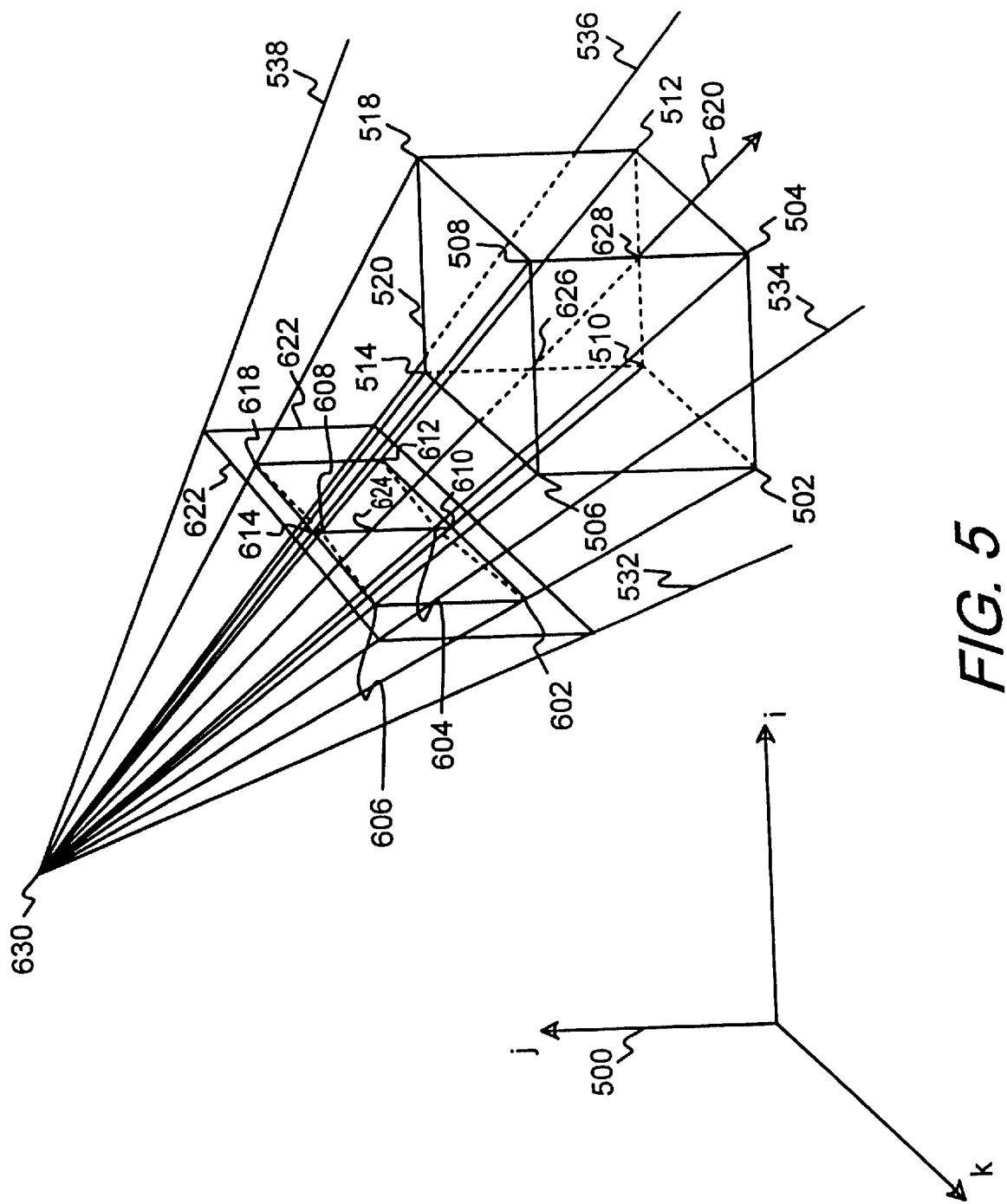
FIG. 5 depicts a volume data set in source space with an image plane for a perspective projection.

In block 220 each ray cast in view space is transformed to source space by multiplying each ray by the inverse combined matrix as more fully explained in the discussion of FIG. 5. Similarly, in block 22 the pixel locations in view space are transformed to source space by multiplying each pixel location by the inverse combined matrix as more fully explained in the discussion of FIG. 3. Control then passes to block 224.

For either an orthographic or perspective rendering, block 224 calculates the intersection of each ray cast with the x, y, and z planes of the volume data set in source space. From these calculations each rays entrance and exit points into and out of the volume data set can be determined, as more fully explained in the discussions of FIGS. 7, 8, and 9. After determining the entrance and exit points for each ray, control returns to the volume rendering system 120.

FIG. 3 depicts an orthographic view of a volume data set in source space. Referring now to FIG. 3, key 300 represents the i, j, and k directions in source space. Volume data set 320 is stored in this orientation in memory and has bounding vertices, 302, 304, 306, 308, 310, 312, 314, and 318, that represent the eight outermost elements of volume data set 320. An orthographic transformation matrix describes how to rotate, translate, and scale volume data set 320 with respect to an image plane in view space for an orthographic rendering. Each of the eight bounding vertices of volume data set 320 are multiplied by the orthographic transformation matrix to transform each bounding vertex into the viewing position from which the user wants to render volume data set 320 in view space, according to the following:

$$[V]'_i = [M] * [V]_i \quad i = 1, \ldots, 8$$

transformed vertex    transformation matrix    source vertex $[V]'_i$ and $[V]_i$ are homogeneous four element column vectors of the form $[x,y,z,1]^T$ and $[M]$ is a 4×4 matrix. Each bounding vertex, 1 to 8, is transformed into view space by multiplication with the orthographic transformation matrix $[M]$.

FIG. 4 depicts an orthographic view of the volume data set of FIG. 3 that has been transformed into view space with an image plane for an orthographic projection. Referring now to FIG. 4, key 400 represents the x, y, and z directions in view space. The eight bounding vertices 302, 304, 306, 308, 310, 312, 314, and 318 of volume data set 320 from FIG. 3 have been transformed into view space by multiplication with the orthographic transformation matrix more fully described in the discussion of FIG. 3. View vector 420 represents the direction of view desired by the user. View vector 420 is, by definition, $[0,0,1,0]^T$ in view space for an orthographic projection. In this example, view vector 420 emanates perpendicularly from image plane 422 at (x,y) pixel location 424. For image plane 422, z=0. View vector 420 enters volume data set 320 at point 426, which in this example is located on edge 310–314 and is equidistantly located between vertices 310 and 314, and exits volume data set 320 at point 428, which is located on edge 304–308 and is equidistantly located between vertices 304 and 308. The eight bounding vertices of volume data set 320 are projected onto image plane 422 with rays that are parallel to view vector 420. Vertex 306 projects to point 406 on image plane 422. Similarly, vertices 318, 302, and 312 project to points 418, 402, and 412 respectively on image plane 422. Vertices 310 and 314 project to points 410 and 414 respectively. Vertices 304 and 308 also project to points 410 and 414 respectively, but they are not visible in the image plane since they fall directly behind points 414 and 410 due to the orientation of view vector 420 in this example.

Referring now back to FIG. 3, view vector 420 in view space (FIG. 4) has been transformed to view vector 420 in source space by multiplying view vector 420 in view space by the inverse of the orthographic transformation matrix referred to above according to the following:

$$[V]_s = [M]^{-1} * [0, 0, 1, 0]^T$$

view vector source space    inverse transformation matrix    view vector view space View vector 420 in source space is the third column of the $[M]^{-1}$ matrix and evaluates to the following:

$$[V]_s = [dx, dy, dz, 0]^T$$

view vector source space    delta values for $x, y, z$

In a similar fashion, (x,y) pixel location 424 (FIG. 4) can be transformed from image plane 422 (FIG. 4) in view space to image plane 422 in source space by multiplying (x,y)

pixel location 424 in view space by the inverse of the transformation matrix referred to above according to the following:

$$[P]_s = [M]^{-1} * [x, y, 0, 1]^T$$

| pixel in | inverse trans- | pixel in |
| source space | formation matrix | view space |

(x,y) pixel location 424 in source space evaluates to the following location:

$$[P]_s = [i, j, k, 1]^T$$

| pixel in | position in |
| source space | source space |

In a similar fashion, all of the points projected onto image plane 422 (FIG. 4) can also be transformed into source space. Rays 332, 334, 336, and 338 project from the four outermost points of image plane 422, and do not pass through volume data set 320. All rays cast from pixel locations outside the projection of volume data set 320 and inside the perimeter of image plane 422 do not pass through volume data set 320 and therefore do not contribute to the rendered image. These rays are ignored by the volume rendering system.

FIG. 5 depicts a perspective view of a volume data set in source space. Referring now to FIG. 5, key 500 represents the i, j, and k directions in source space. Volume data set 520 is stored in this orientation in memory and has bounding vertices, 502, 504, 506, 508, 510, 512, 514, and 518, that represent the eight outermost elements of volume data set 520. A combined matrix, derived by multiplying an orthographic model-view matrix by a perspective matrix, describes how to rotate, translate, and scale volume data set 520 with respect to an image plane and an eye point, or center of projection, in view space for a perspective rendering. Each of the eight bounding vertices of volume data set 520 are multiplied by the combined matrix to transform each bounding vertex into the viewing position the user wants to render volume data set 520 from in view space according to the following:

$$[V]'_i = [C] * [V]_i \quad i = 1, \ldots, 8$$

| transformed | combined | source |
| vertex | matrix | vertex |

$[V]'_i$ and $[V]_i$ are homogeneous four element column vectors of the form $[x,y,z,1]^T$ and $[C]$ is a 4×4 matrix. Each bounding vertex, 1 to 8, is transformed into view space by multiplication with the combined matrix $[C]$.

FIG. 6 depicts a perspective view of the volume data set of FIG. 5 that has been transformed into view space with an image plane and an eye point, or center of projection, for a perspective projection. Referring now to FIG. 6, key 600 represents the x, y, and z directions in view space. The eight bounding vertices 502, 504, 506, 508, 510, 512, 514, and 518 of volume data set 520 from FIG. 5 have been transformed into view space in relation to eye point 630 by multiplication with the combined matrix described in the discussion of FIG. 5. In a perspective rendering, there is only one ray having a vector value of $[0,0,1,0]^T$. All other rays have a vector value in the form of $[x/d,y/d,1,0]^T$ where "d" is the, distance value from the eye point, or center of projection, to the image plane. In this example, ray 620 has the vector value of $[0,0,1,1]^T$. Ray 620 by definition emanates perpendicularly from image plane 622 at (x,y) pixel location 624. Ray 620 enters volume data set 520 at point 626, which in this example is equidistantly located between vertices 510 and 514, and exits volume data set 520 at point 628, which is equidistantly located between vertices 504 and 508. The eight bounding vertices of volume data set 520 are projected onto image plane 622. For image plane 622, z=0. Vertex 506 projects to point 606 on image plane 622. Similarly, vertices 518, 502, and 512 project to points 618, 602, and 612 respectively on image plane 622. Vertices 510 and 514 project to points 610 and 614 respectively. Vertices 504 and 508 project to points 604 and 608 respectively.

Referring now back to FIG. 5, ray 620 in view space (FIG. 6) has been transformed to ray 620 in source space by multiplying ray 620 in view space by the inverse of the combined matrix referred to above according to the following:

$$[V]_s = [C]^{-1} * [x/d, y/d, 1, 0]^T$$

| ray in | inverse | ray in |
| source space | combined matrix | view space |

Ray 620 in source space evaluates to the following:

$$[V]_s = [dx, dy, dz, 0]^T$$

| ray in | delta values |
| source space | for x, y, z |

In a similar fashion, (x,y) pixel location 624 (FIG. 6) can be transformed from image plane 622 (FIG. 6) in view space to image plane 622 in source space by multiplying (x,y) pixel location 624 in view space by the inverse of the combined matrix referred to above according to the following:

(x,y) pixel location 624 in source space evaluates to the $$[P]_s = [C]^{-1} * [x, y, 0, 1]^T$$

| pixel in | inverse | pixel in |
| source space | combined matrix | view space | following location:

$$[P]_s = [i, j, k, 1]^T$$

| pixel in | position in |
| source space | source space |

In a similar fashion, all of the points projected onto image plane 622 (FIG. 6) can also be transformed into source space. Rays 532, 534, 536, and 538 project from the four outermost points of image plane 622, and do not pass through volume data set 520. All rays cast from pixel locations outside the projection of volume data set 520 and inside the perimeter of image plane 622 do not pass through volume data set 520 and therefore do not contribute to the rendered image. These rays are ignored by the volume rendering system.

Figure 7:
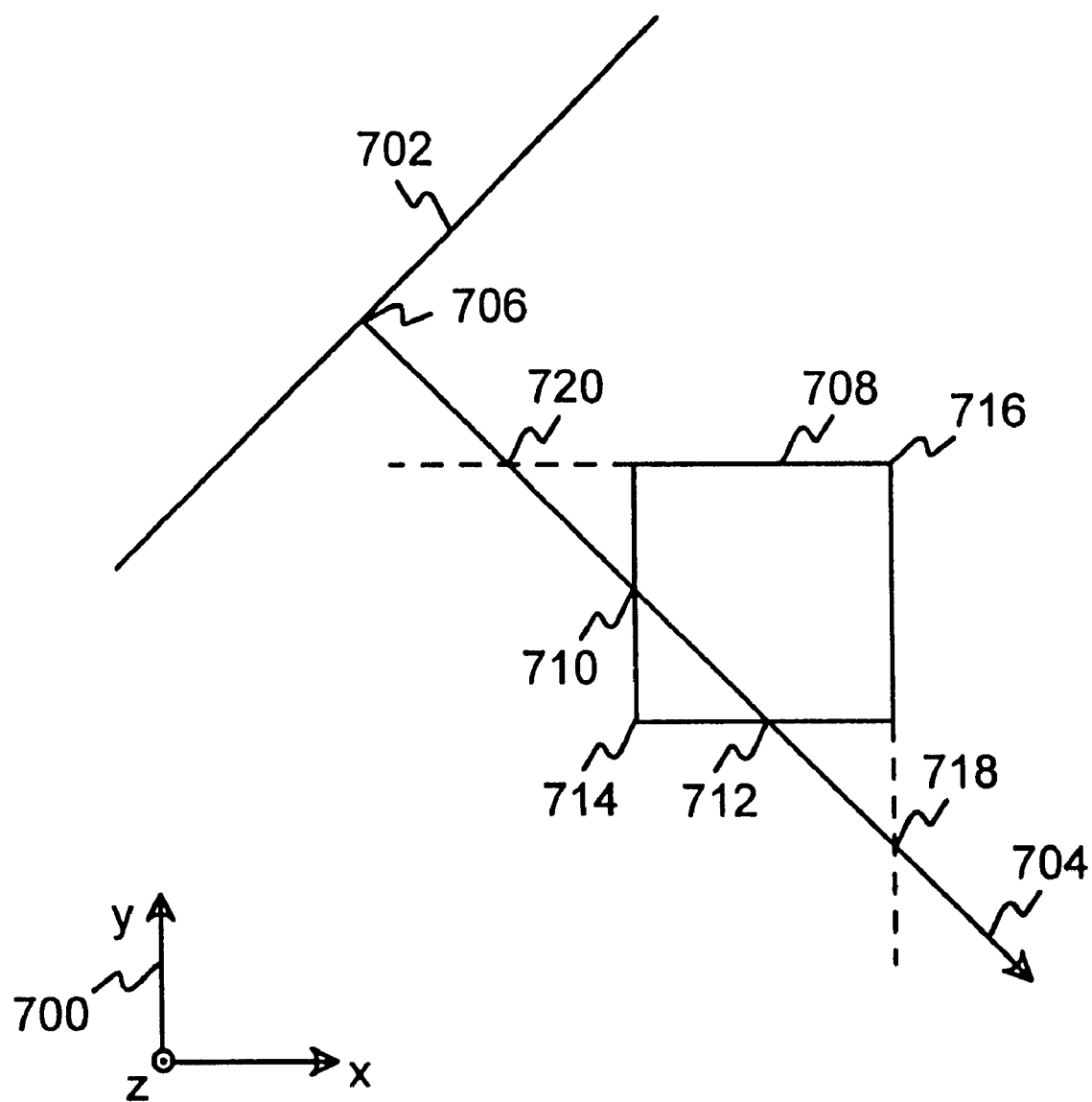
FIG. 7 depicts a 2D representation of a ray emanating from a view plane that enters and exits a volume data set in source space.

FIG. 7 depicts a 2D representation of a ray emanating from a view plane that enters and exits a volume data set in source space. Referring now to FIG. 7, key 700 represents the x, y, and z directions in source space, with the z-direction extending perpendicularly out of the plane of the paper. Image plane 702 also extends perpendicularly out from the plane of the paper. Ray 704 emanates perpendicularly from image plane 702 at (x,y) pixel location 706. (x,y) pixel location 706 is of the form $[P]_s=[x_i,y_i,z_i]^T$. In this example, $z_i$ is equal to 0. Volume data set 708 also extends perpendicularly out of the plane of the paper. Point 714 represents $(x_o,y_o,z_o)$, the lower left corner of volume data set 708. Point 716 represents $(x_u,y_u,z_u)$ the upper right corner of volume data set 708. Ray 704 is of the form $[V]_s=[dx,dy,dz]^T$ and intersects volume data set 708, entering at entrance point 710, and exiting at exit point 712. In this example, dz=0. Entrance point 710, and exit point 712 are the indices in terms of $[V]_s$ that define the entering and exit points of ray 704 with volume data set 708.

Determining the entrance point value and the exit point value involves calculating the intersection of both points with the x, y, and z planes that define the outline of volume data set 708 in source space. For each point, an x index, y index, and z index value will be established. Relative to each other, the x, y, and z index values for one point will be lower or higher than the corresponding x, y, and z index values for the other point. The value of the entrance point is derived from the following:

$$\text{entrance point} = \max (x\text{lower\_index}, y\text{lower\_index}, z\text{lower\_index})$$

Similarly, the value of the exit point is derived from the following:

$$\text{exit point} = \min (x\text{upper\_index}, y\text{upper\_index}, z\text{upper\_index})$$

xlower_index and xupper_index are derived from the following:

$$x\text{lower\_index}=(x_0-x_i)/dx$$

$$x\text{upper\_index}=(x_u-x_i)/dx$$

In this example, the delta x value, or dx, is greater than zero, meaning the incremental change in the x direction of ray 704 is in the positive x direction. Therefore, no adjustments need to be made to these two values. xlower_index evaluates to entrance point 710, and xupper_index evaluates to point 718.

ylower_index and yupper_index are derived from the following:

$$y\text{lower\_index}=(y_0-y_i)/dy$$

$$y\text{upper\_index}=(y_u-y_i)/dy$$

In this example, the delta y value, or dy, is less than zero, meaning the incremental change in the y direction of ray 704 is in the negative y direction. In this situation, the values of ylower_index and yupper_index must be swapped. ylower_index is assigned the value of yupper_index, and yupper_index is assigned the value of ylower_index. ylower_index evaluates to exit point 712 and yupper_index evaluates to point 720. After swapping, ylower_index has the value of point 720, and yupper_index has the value of exit point 712.

zlower_index and zupper_index are derived from the following:

$$z\text{lower\_index}=(z_0-z_i)/dz$$

$$z\text{upper\_index}=(z_u-z_i)/dz$$

In this example, the delta z value, or dz, is equal to zero, meaning the incremental change in the z direction of ray 704 is zero. In this situation, where division by zero is not allowed, the values of zlower_index and zupper_index must be set to values such that the entering and exiting point calculations will not be affected. If $z_i<z_0$, or if $z_i>z_d$, then the ray is outside the volume data set and does not intersect it. In this case, zupper_index is assigned the value of 0, and zlower_index is assigned the largest integer value allowable for the particular computer system the volume rendering system is being run on. Most computer systems have a symbol defined for this highest allowable integer value, and that symbol/value is used.

If $z_0<=z_i<=x_u$, then the ray is potentially inside the volume data set. In this case, zlower_index is assigned the value of 0, and zupper_index is assigned the largest integer value allowable for the particular computer system the volume rendering system is being run on. In this example, $z_0=z_i=0$, so zlower_index is assigned the value of 0, and zupper_index is assigned the largest integer value allowable by the system.

In this example, the entrance point evaluates to the following:

$$\text{entrance point} = \max (x\text{lower\_index}, y\text{lower\_index}, z\text{lower\_index})$$
$$\text{entrance point} = \max(\text{entrance point } 710, \text{point } 720, 0) =$$
$$\text{entrance point } 710$$

In this example, the exit point evaluates to the following:

$$\text{exit point} = \min (x\text{upper\_index}, y\text{upper\_index}, z\text{upper\_index})$$
$$\text{exit point} = \min(\text{point } 718, \text{exit point } 712, \text{largest integer}) =$$
$$\text{exit point } 712$$

The values for the entrance point and the exit point must be converted to (x,y,z) coordinates in source space. This is accomplished as follows:

x coordinate entrance point=(entrance point 710*dx)+$x_i$
y coordinate entrance point=(entrance point 710*dy)+$y_i$
z coordinate entrance point=(entrance point 710*dz)+$z_i$
x coordinate exit point=(exit point 712*dx)+$x_i$
y coordinate exit point=(exit point 712*dy)+$y_i$
z coordinate exit point=(exit point 712*dz)+$z_i$ The entrance point and the exit point coordinates are passed to the volume rendering system. Only sample points along the ray between these two points will be processed by the volume rendering system.

Figure 8:
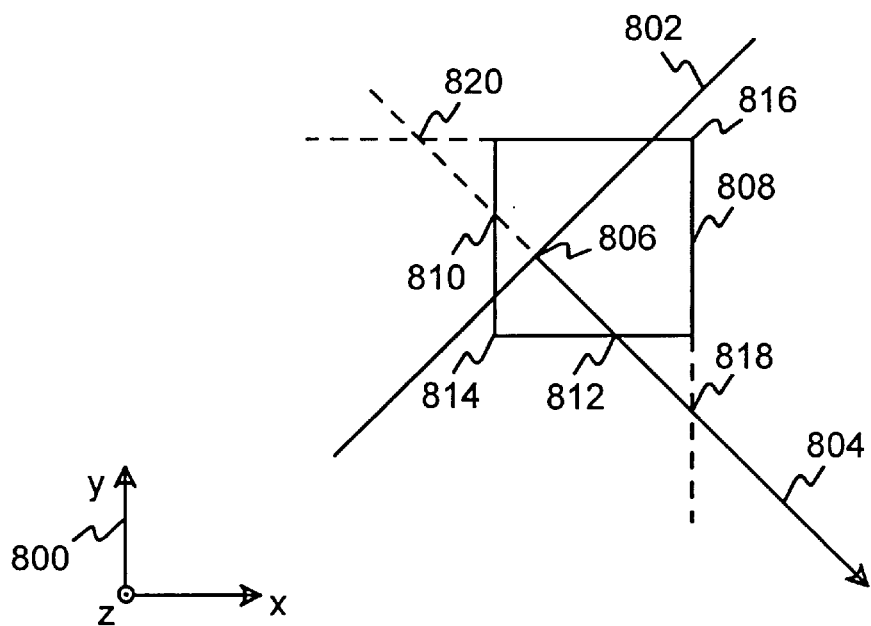
FIG. 8 depicts a 2D representation of a ray emanating from a view plane that enters and exits a volume data set in source space where the image plane falls within the volume data set.

FIG. 8 depicts a 2D representation of a ray emanating from a view plane that enters and exits a volume data set in source space where the image plane falls within the volume data set. Referring now to FIG. 8, key 800 represents the x, y, and z directions in source space, with the z-direction extending perpendicularly out of the plane of the paper. Image plane 802 also extends perpendicularly out from the plane of the paper. Ray 804 emanates perpendicularly from image plane 802 at (x,y) pixel location 806. (x,y) pixel location 806 is of the form $[P]_s=[x_i,y_i,z_i]^T$. In this example, $z_i$ is equal to 0. Volume data set 808 also extends perpendicularly out of the plane of the paper. Point 814 represents $(x_o,y_o,z_o)$, the lower left corner of volume data set 808. Point 816 represents $(x_u,y_u,z_u)$ the upper right corner of volume data set 808. Ray 804 is of the form $[V]_s=[dx,dy,dz]^T$ and intersects volume data set 808, entering at entrance point 810, which is behind image plane 802, and exiting at exit point 812. In this example, dz=0. Enter point 810 and exit point 812 are the indices in terms of $[V]_s$ that define the entering and exit points of ray 804 with volume data set 808.

Determining the value of the entrance point and the exit point involves calculating the intersection of both points with the x, y, and z planes that define the outline of volume data set 808 in source space. For each point, an x index, y index, and z index value will be established. Relative to each other, the x, y, and z index values for one point will be lower or higher than the corresponding x, y, and z index values for the other point. The value of the entrance point is derived from the following:

entrance point=max (xlower_index, ylower_index, zlower_index)

Similarly, the value of the exit point is derived from the following:

exit point=min (xupper_index, yupper_index, zupper_index)

xlower_index and xupper_index are derived from the following:

$xlower\_index = (x_0 - x_i)/dx$ $xupper\_index = (x_u - x_i)/dx$

In this example, dx>0, meaning the incremental change in the x direction of ray 804 is in the positive x direction. Therefore, no adjustments need to be made to these two values. xlower_index evaluates to entrance point 810, and xupper_index evaluates to point 818.

ylower_index and yupper_index are derived from the following:

$ylower\_index = (y_0 - y_i)/dy$ $yupper\_index = (y_u - y_i)/dy$

In this example, dy<0, meaning the incremental change in the y direction of ray 804 is in the negative y direction. In this situation, the values of ylower_index and yupper_index must be swapped. ylower_index is assigned the value of yupper_index, and yupper_index is assigned the value of ylower_index. ylower_index evaluates to exit point 812 and yupper_index evaluates to point 820. After swapping, ylower_index has the value of point 820, and yupper_index has the value of exit point 812.

zlower_index and zupper_index are derived from the following:

$zlower\_index = (z_0 - z_i)/dz$ $zupper\_index = (z_u - z_i)/dz$

In this example, dz=0, meaning the incremental change in the z direction of ray 804 is zero. In this situation, where division by zero is not allowed, the values of zlower_index and zupper_index must be set to values such that the entering and exiting point calculations will not be affected. If $z_i < z_0$, or if $z_i > z_u$, then the ray is outside the volume data set and does not intersect it. In this case, zupper_index is assigned the value of 0, and zlower_index is assigned the largest integer value allowable for the particular computer system the volume rendering system is being run on. Most computer systems have a symbol defined for this highest allowable integer value, and that symbol/value is used.

If $z_0 <= z_i <= z_u$, then the ray is potentially inside the volume data set. In this case, zlower_index is assigned the value of 0, and zupper_index is assigned the largest integer value allowable for the particular computer system the volume rendering system is being run on. In this case, $z_0 = z_i = 0$, so zlower_index is assigned the value of 0, and zupper_index is assigned the largest integer value allowable by the system.

In this example, xlower_index and ylower_index have negative values because they are behind image plane 802. Thus, the entrance point evaluates to the following:

entrance point=max (xlower_index, ylower_index, zlower_index)

entrance point=max (entrance point 810, point 820, 0)=0

In this example, the exit point evaluates to the following:

exit point = min (xupper_index, yupper_index, zupper_index)

exit point = min(point 818, exit point 812, largest integer) = exit point 812

The values for the entrance point and the exit point must be converted to (x,y,z) coordinates in source space. This is accomplished as follows:

x coordinate entrance point=(0\*dx)+$x_i$ y coordinate entrance point=(0\*dy)+$y_i$ z coordinate entrance point=(0\*dz)+$z_i$ x coordinate exit point=(exit point 812\*dx)+$x_i$ y coordinate exit point=(exit point 812\*dy)+$y_i$ z coordinate exit point=(exit point 812\*dz)+$z_i$ The entrance point and the exit point coordinates are passed to the volume rendering system. Only sample points along the ray between these two points will be processed by the volume rendering system.

Figure 9:
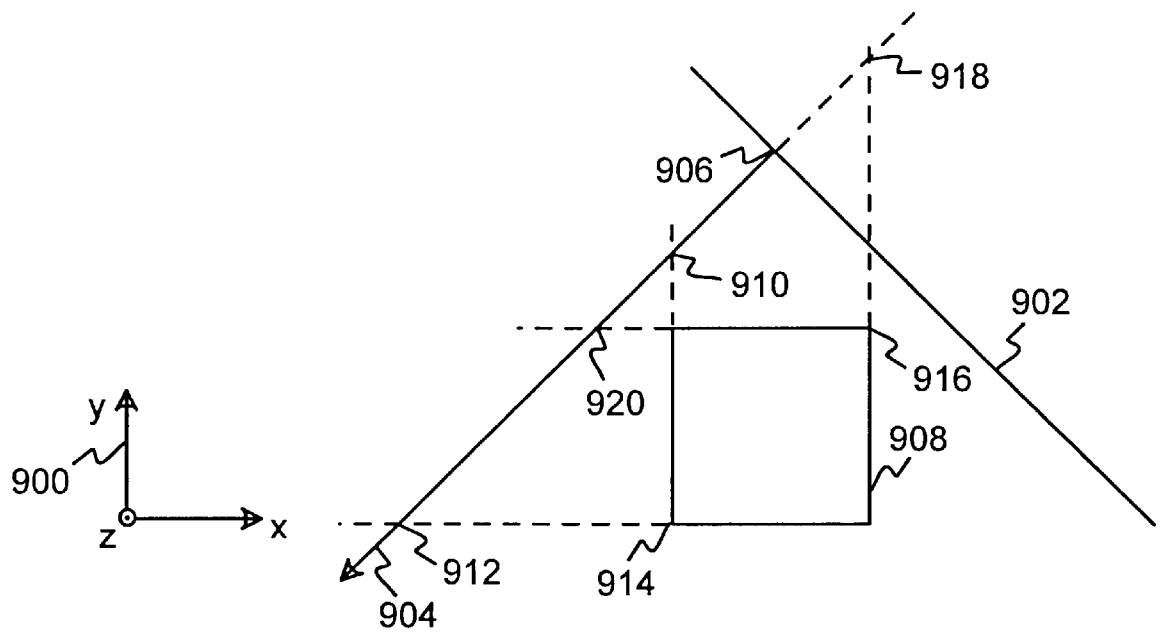
FIG. 9 depicts a 2D representation of a ray emanating from a view plane that misses a volume data set in source space.

FIG. 9 depicts a 2D representation of a ray emanating from a view plane that does not intersect a volume data set in source space. Referring now to FIG. 9, key 900 represents the x, y, and z directions in source space, with the z-direction extending perpendicularly out of the plane of the paper. Image plane 902 also extends perpendicularly out from the plane of the paper. Ray 904 emanates perpendicularly from image plane 902 at (x,y) pixel location 906. (x,y) pixel location 906 is of the form $[P]_s = [x_i, y_i, z_i]^T$. In this example, $z_i$ is equal to 0. Volume data set 908 also extends perpendicularly out of the plane of the paper. Point 914 represents $(x_o, y_o, z_o)$, the lower left corner of volume data set 908. Point 916 represents $(x_u, y_u, z_u)$ the upper right corner of volume data set 908. Ray 904 is of the form $[V]_s = [dx, dy, dz]^T$ and does not intersect volume data set 908. In this example, dz=0.

Determining the value of the entrance point and the exit point involves calculating the intersection of both points with the x, y, and z planes which define the outline of volume data set 908 in source space. For each point, an x index, y index, and z index value will be established. Relative to each other, the x, y, and z index values for one point will be lower or higher than the corresponding x, y, and z index values for the other point. When a ray does not intersect a volume data set, then the entrance point value will be greater than the exit point value. The value of the entrance point is derived from the following:

entrance point=max (xlower_index, ylower_index, zlower_index)

Similarly, the value of the exit point is derived from the following:

exit point=min (xupper_index, yupper_index, zupper_index)

xlower_index and xupper_index are derived from the following:

$xlower\_index = (x_0 - x_i)/dx$ $xupper\_index = (x_u - x_i)/dx$

In this example, dx<0, meaning the incremental change in the x direction of ray 904 is in the negative x direction. In this situation, the values of xlower_index and xupper_index must be swapped. xlower_index is assigned the value of xupper_index, and xupper_index is assigned the value of xlower_index. xlower_index evaluates to point 910 and xupper_index evaluates to point 918. After swapping, xlower_index has the value of point 918, and xupper_index has the value of point 910.

ylower_index and yupper_index are derived from the following:

$$ylower\_index = (y_0 - y_i)/dy$$

$$yupper\_index = (y_u - y_i)/dy$$

In this example, dy<0, meaning the incremental change in the y direction of ray 904 is in the negative y direction. In this situation, the values of ylower_index and yupper_index must be swapped. ylower_index is assigned the value of yupper_index, and yupper_index is assigned the value of ylower_index. ylower_index evaluates to point 912 and yupper_index evaluates to point 920. After swapping, ylower_index has the value of point 920, and yupper_index has the value of point 912.

zlower_index and zupper_index are derived from the following:

$$zlower\_index = (z_0 - z_i)/dz$$

$$zupper\_index = (z_u - z_i)/dz$$

In this example, dz=0, meaning the incremental change in the z direction of ray 904 is zero. In this situation, where division by zero is not allowed, the values of zlower_index and zupper_index must be set to values such that the entering and exiting point calculations will not be affected. If $z_i < z_0$, or if $z_i > z_u$, then the ray is outside the volume data set and does not intersect it. In this case, zupper_index is assigned the value of 0, and zlower_index is assigned the largest integer value allowable for the particular computer system the volume rendering system is being run on. Most computer systems have a symbol defined for this highest allowable integer value, and that symbol/value is used.

If $z_0 <= z_i <= z_u$, then the ray is potentially inside the volume data set. In this case, zlower_index is assigned the value of 0, and zupper_index is assigned the largest integer value allowable for the particular computer system the volume rendering system is being run on. In this case, $z_0 = z_i = 0$, so zlower_index is assigned the value of 0, and zupper_index is assigned the largest integer value allowable by the system.

In this example, the entrance point evaluates to the following:

entrance point=max (xlower_index, ylower_index, zlower_index)

entrance point=max (point 918, point 920, 0)=point 920

In this example, the exit point evaluates to the following:

$$exit\ point = \min\ (xupper\_index, yupper\_index, zupper\_index)$$
$$exit\ point = \min(point\ 910, point\ 912, largest\ integer) = point\ 910$$

Since point 920, the entrance point, is greater than point 910, the exit point, ray 904 does not pass through volume data set 908 and is not further processed by the volume rendering system.

Having described a presently preferred embodiment of the present invention, it will be understood by those skilled in the art that many changes in construction and widely differing embodiments and applications of the invention will suggest themselves without departing from the scope of the present invention, as defined in the claims. The disclosures and the description herein are intended to be illustrative and are not in any sense limiting of the invention, defined in scope by the following claims.

What is claimed is:

1. A volumetric pre-clipping method for minimizing sample points processed through a volume rendering system for rendering a volume data set on a 2D graphics display of a computer system, said method comprising the steps of:

(a) projecting a volume data set onto an image plane, said image plane having a plurality of pixels, to create a projection of said volume data set on said image plane, comprising the steps of (a1) converting each of the bounding vertices of said volume data set to homogeneous coordinates, (a2) transforming each of said bounding vertices of said volume data set from a source space containing said volume data set to a view space by multiplying each of said homogeneous coordinates of each of said bounding vertices by an orthographic transformation matrix, yielding transformed bounding vertices in said view space;

(a3) determining a view vector in said view space, (a4) projecting each of said transformed bounding vertices onto a view plane in said view space through a plurality of rays parallel to said view vector, wherein one of each of said plurality of rays passes through one of each of said transformed bounding vertices, and further wherein said view plane has a plurality of pixels, (a5) transforming said view vector from said view space to said source space by multiplying said view vector by an inverse orthographic transformation matrix yielding a transformed view vector in said source space, and (a6) transforming said plurality of pixels on said view plane in said view space to said image plane in said source space by multiplying each of said plurality of pixels by said inverse orthographic transformation matrix yielding a transformed plurality of pixels in said source space, wherein said projection of said volume data set on said image plane is created;

(b) casting a ray from each of said plurality of pixels, wherein each said ray has a plurality of sample points, to create a plurality of rays;

(c) clipping all of said plurality of rays cast from pixels that are located outside of said projection of said volume data set on said image plane; and (d) processing, through a volume rendering system, said plurality of sample points located on each ray cast from pixels that are located inside of said projection of said volume data set on said image plane.

2. A volumetric pre-clipping method for minimizing sample points processed through a volume rendering system for rendering a volume data set on a 2D graphics display of a computer system, said method comprising the steps of:

(a) projecting a volume data set onto an image plane, said image plane having a plurality of pixels, to create a projection of said volume data set on said image plane, comprising the steps of (a1) converting each of the bounding vertices of said volume data set to homogeneous coordinates, (a2) determining a distance value from an eye point and said image plane, (a3) multiplying an orthographic matrix by a perspective matrix to yield a combined matrix, (a4) transforming each of said bounding vertices of said volume data set from a source space containing said volume data set to a view space by multiplying each of said homogeneous coordinates of each of said bounding vertices by said combined matrix, yielding transformed bounding vertices, (a5) projecting said transformed bounding vertices onto a view plane in said view space through a plurality of rays emanating from said eye point, wherein one of each of said plurality of rays passes through one of each of said transformed bounding vertices, and further wherein said view plane has a plurality of pixels, (a6) transforming each of said plurality of rays from said view space to said source space by multiplying each of said plurality of rays by an inverse combined matrix yielding a transformed plurality of rays in said source space, and (a7) transforming said plurality of pixels on said view plane in said view space to said image plane in said source space by multiplying each of said plurality of pixels by said inverse combined matrix yielding a transformed plurality of pixels in said source space, wherein said projection of said volume data set on said image plane is created;

(b) casting a ray from each of said plurality of pixels, wherein each said ray has a plurality of sample points, to create a plurality of rays;

(c) clipping all of said plurality of rays cast from pixels that are located outside of said projection of said volume data set on said image plane; and (d) processing, through a volume rendering system, said plurality of sample points located on each ray cast from pixels that are located inside of said projection of said volume data set on said image plane.

3. A volumetric pre-clipping method for minimizing sample points processed through a volume rendering system for rendering a volume data set on a 2D graphics display of a computer system, said method comprising the steps of:

(a) projecting a volume data set onto an image plane, said image plane having a plurality of pixels, to create a projection of said volume data set on said image plane;

(b) casting a ray from each of said plurality of pixels, wherein each said ray has a plurality of sample points, to create a plurality of rays;

(c) clipping all of said plurality of rays cast from pixels that are located outside of said projection of said volume data set on said image plane; and (d) processing, through a volume rendering system, said plurality of sample points located on each ray cast from pixels that are located inside of said projection of said volume data set on said image plane, comprising the steps of:

(d1) calculating an entrance point and an exit point on each of said rays, comprising the steps of (d1a) calculating an x lower index, a y lower index, a z lower index, an x upper index, a y upper index, and a z upper index for each of said rays, (d1a1) determining a delta x value, a delta y value, and a delta z value for each of said rays, (d1a2) swapping said x lower index with said x upper index for each of said rays when said delta x value for each of said rays is less than zero, (d1a3) swapping said y lower index with said y upper index for each of said rays when said delta y value for each of said rays is less than zero, (d1a4) swapping said z lower index with said z upper index for each of said rays when said delta z value for each of said rays is less than zero, (d1a5) assigning x lower to zero and assigning x upper to a large integer for each of said rays when said delta x value for each of said rays is equal to zero and said ray is potentially located inside said volume data set, (d1a6) assigning y lower to zero and assigning y upper to said large integer for each of said rays when said delta y value for each of said rays is equal to zero and said ray is potentially located inside said volume data set, (d1a7) assigning z lower to zero and assigning z upper to said large integer for each of said rays when said delta z value for each of said rays is equal to zero and said ray is potentially located inside said volume data set, (d1a8) assigning x lower to said large integer and assigning x upper to zero for each of said rays when said delta x value for each of said rays is equal to zero and said ray is located outside said volume data set, (d1a9) assigning y lower to said large integer and assigning y upper to zero for each of said rays when said delta y value for each of said rays is equal to zero and said ray is located outside said volume data set, and (d1a10) assigning z lower to said large integer and assigning z upper to zero for each of said rays when said delta z value for each of said rays is equal to zero and said ray is located outside said volume data set, (d1b) determining an entrance point value from the maximum of said x lower index, said y lower index, said z lower index, and zero for each of said rays, (d1c) determining an exit point value from the minimum of said x upper index, said y upper index, and said z upper index for each of said rays, (d1d) converting said entrance point value and said exit point value for each of said rays to said entrance point and said exit point for each of said rays, wherein said entrance point has an (x,y,z) coordinate in source space and said exit point has an (x,y,z) coordinate in source space, and (d1e) passing said (x,y,z) coordinate of said entrance point and said (x,y,z) coordinate of said exit point for each of said rays to said volume rendering system;

(d2) clipping a front portion of said plurality of sample points on each of said rays, wherein said front portion of said plurality of sample points on each of said rays lies outside of said volume data set and between said image plane and said entrance point;

(d3) clipping a back portion of said plurality of sample points on each of said rays, wherein said back portion of said plurality of sample points on each of said rays lies outside of said volume data set and beyond said exit point on each of said rays in a direction away from said image plane; and (d4) processing, through a volume rendering system, a middle portion of said plurality of sample points on each of said rays, wherein said middle portion of said plurality of sample points on each of said rays lies inside of said volume data set and between said entrance point and said exit point on each of said rays.

4. A volumetric pre-clipping method for minimizing sample points processed through a volume rendering system for rendering a volume data set on a 2D graphics display of a computer system, said method comprising the steps of:

(a) projecting a volume data set onto an image plane, said image plane having a plurality of pixels, to create a projection of said volume data set on said image plane;

(b) casting a ray from each of said plurality of pixels, wherein each said ray has a plurality of sample points, to create a plurality of rays;

(c) clipping all of said plurality of rays cast from pixels that are located outside of said projection of said volume data set on said image plane; and (d) processing, through a volume rendering system, said plurality of sample points located on each ray cast from pixels that are located inside of said projection of said volume data set on said image plane, comprising the steps of (d1) calculating an entrance point and an exit point on each of said rays, (d1a) calculating an x lower index, a y lower index, a z lower index, an x upper index, a y upper index, and a z upper index for each of said rays, (d1b) determining an entrance point value from the maximum of said x lower index, said y lower index, said z lower index, and zero for each of said rays, (d1c) determining an exit point value from the minimum of said x upper index, said y upper index, and said z upper index for each of said rays, (d1c1) clipping each of said rays when said entrance point value for each of said rays is greater than said exit point value for each of said rays, (d1d) converting said entrance point value and said exit point value for each of said rays to said entrance point and said exit point for each of said rays, wherein said entrance point has an (x,y,z) coordinate in source space and said exit point has an (x,y,z) coordinate in source space, and (d1e) passing said (x,y,z) coordinate of said entrance point and said (x,y,z) coordinate of said exit point for each of said rays to said volume rendering system, (d2) clipping a front portion of said plurality of sample points on each of said rays, wherein said front portion of said plurality of sample points on each of said rays lies outside of said volume data set and between said image plane and said entrance point, (d3) clipping a back portion of said plurality of sample points on each of said rays, wherein said back portion of said plurality of sample points on each of said rays lies outside of said volume data set and beyond said exit point on each of said rays in a direction away from said image plane, and (d4) processing, through a volume rendering system, a middle portion of said plurality of sample points on each of said rays, wherein said middle portion of said plurality of sample points on each of said rays lies inside of said volume data set and between said entrance point and said exit point on each of said rays.

5. A volumetric pre-clipping method for minimizing sample points processed through a volume rendering system for rendering a volume data set on a 2D graphics display of a computer system, said method comprising the steps of:

(a) determining an image plane in a source space, said image plane having a plurality of pixels;

(b) casting a ray from each of said plurality of pixels, wherein each said ray has a plurality of sample points, to create a plurality of rays, comprising the steps of (b1) projecting said volume data set onto said image plane to create a projection of said volume data set on said image plane, and (b1a) converting each of the bounding vertices of said volume data set to homogeneous coordinates, (b1b) transforming each of said bounding vertices of said volume data set from said source space containing said volume data set to a view space by multiplying each of said homogeneous coordinates of each of said bounding vertices by an orthographic transformation matrix, yielding transformed bounding vertices in said view space, (b1c) determining a view vector in said view space, (b1d) projecting each of said transformed bounding vertices onto a view plane in said view space through a plurality of rays parallel to said view vector, wherein one of each of said plurality of rays passes through one of each of said transformed bounding vertices, and further wherein said view plane has a plurality of pixels, (b1e) transforming said view vector from said view space to said source space by multiplying said view vector by an inverse orthographic transformation matrix yielding a transformed view vector in said source space, and (b1f) transforming said plurality of pixels on said view plane in said view space to said image plane in said source space by multiplying each of said plurality of pixels by said inverse orthographic transformation matrix yielding a transformed plurality of pixels in said source space, wherein said projection of said volume data set on said image plane is created, (b2) clipping all of said plurality of rays that are cast from pixels that are located outside of said projection of said volume data set on said image plane;

(c) calculating an entrance point on each of said rays;

(d) clipping a front portion of said plurality of sample points on each of said rays, wherein said front portion of said plurality of sample points on each of said rays lies outside of a volume data set and between said image plane and said entrance point; and (e) processing, through a volume rendering system, a back portion of said plurality of sample points on each of said rays, wherein said back portion of said plurality of sample points on each of said rays lies beyond said entrance point on each of said rays in a direction away from said image plane.

6. A volumetric pre-clipping method for minimizing sample points processed through a volume rendering system for rendering a volume data set on a 2D graphics display of a computer system, said method comprising the steps of:

(a) determining an image plane in a source space, said image plane having a plurality of pixels;

(b) casting a ray from each of said plurality of pixels, wherein each said ray has a plurality of sample points, to create a plurality of rays, comprising the steps of (b1) projecting said volume data set onto said image plane to create a projection of said volume data set on said image plane, comprising the steps of
  (b1a) converting each of the bounding vertices of said volume data set to homogeneous coordinates,
  (b1b) determining a distance value from an eye point and said image plane,
  (b1c) multiplying an orthographic matrix by a perspective matrix to yield a combined matrix,
  (b1d) transforming each of said bounding vertices of said volume data set from said source space containing said volume data set to a view space by multiplying each of said homogeneous coordinates of each of said bounding vertices by said combined matrix, yielding transformed bounding vertices,
  (b1e) projecting said transformed bounding vertices onto a view plane in said view space through a plurality of rays emanating from said eye point, wherein one of each of said plurality of rays passes through one of each of said transformed bounding vertices, and further wherein said view plane has a plurality of pixels,
  (b1f) transforming each of said plurality of rays from said view space to said source space by multiplying each of said plurality of rays by an inverse combined matrix, yielding a transformed plurality of rays in said source space, and
  (b1g) transforming said plurality of pixels on said view plane in said view space to said image plane in said source space by multiplying each of said plurality of pixels by said inverse combined matrix yielding a transformed plurality of pixels in said source space, wherein said projection of said volume data set on said image plane is created,
(b2) clipping all of said plurality of rays that are cast from pixels that are located outside of said projection of said volume data set on said image plane;
(c) calculating an entrance point on each of said rays;
(d) clipping a front portion of said plurality of sample points on each of said rays, wherein said front portion of said plurality of sample points on each of said rays lies outside of a volume data set and between said image plane and said entrance point; and
(e) processing, through a volume rendering system, a back portion of said plurality of sample points on each of said rays, wherein said back portion of said plurality of sample points on each of said rays lies beyond said entrance point on each of said rays in a direction away from said image plane.

7. A volumetric pre-clipping method for minimizing sample points processed through a volume rendering system for rendering a volume data set on a 2D graphics display of a computer system, said method comprising the steps of:
(a) determining an image plane in a source space, said image plane having a plurality of pixels;
(b) casting a ray from each of said plurality of pixels, wherein each said ray has a plurality of sample points, to create a plurality of rays;
(c) calculating an entrance point on each of said rays, comprising the steps of
  (c1) calculating an x lower index, a y lower index, and a z lower index for each of said rays,
    (c1a) calculating an x upper index, a y upper index, and a z upper index for each of said rays,
    (c1b) determining a delta x value, a delta y value, and a delta z value for each of said rays,
    (c1c) swapping said x lower index with said x upper index for each of said rays when said delta x value for each of said rays is less than zero,
    (c1d) swapping said y lower index with said y upper index for each of said rays when said delta y value for each of said rays is less than zero,
    (c1e) swapping said z lower index with said z upper index for each of said rays when said delta z value for each of said rays is less than zero,
    (c1f) assigning x lower to zero and assigning x upper to a large integer for each of said rays when said delta x value for each of said rays is equal to zero and said ray is potentially located inside said volume data set,
    (c1g) assigning y lower to zero and assigning y upper to said large integer for each of said rays when said delta y value for each of said rays is equal to zero and said ray is potentially located inside said volume data set,
    (c1h) assigning z lower to zero and assigning z upper to said large integer for each of said rays when said delta z value for each of said rays is equal to zero and said ray is potentially located inside said volume data set,
    (c1i) assigning x lower to said large integer and assigning x upper to zero for each of said rays when said delta x value for each of said rays is equal to zero and said ray is located outside said volume data set,
    (c1j) assigning y lower to said large integer and assigning y upper to zero for each of said rays when said delta y value for each of said rays is equal to zero and said ray is located outside said volume data set, and
    (c1k) assigning z lower to said large integer and assigning z upper to zero for each of said rays when said delta z value for each of said rays is equal to zero and said ray is located outside said volume data set,
  (c2) determining an entrance point value from the maximum of said x lower index, said y lower index, said z lower index, and zero for each of said rays,
  (c3) converting said entrance point value for each of said rays to said entrance point for each of said rays, wherein said entrance point has an (x,y,z) coordinate in source space, and
  (c4) passing said (x,y,z) coordinate of said entrance point for each of said rays to said volume rendering system;
(d) clipping a front portion of said plurality of sample points on each of said rays, wherein said front portion of said plurality of sample points on each of said rays lies outside of a volume data set and between said image plane and said entrance point; and
(e) processing, through a volume rendering system, a back portion of said plurality of sample points on each of said rays, wherein said back portion of said plurality of sample points on each of said rays lies beyond said entrance point on each of said rays in a direction away from said image plane.

8. A volumetric pre-clipping method of minimizing sample points processed through a volume rendering system for rendering a volume data set on a 2D graphics display of a computer system, said method comprising the steps of:
(a) determining an image plane in a source space, said image plane having a plurality of pixels;
(b) casting a ray from each of said plurality of pixels, wherein each said ray has a plurality of sample points, to create a plurality of rays;

(c) calculating an entrance point on each of said rays, comprising the steps of
  (c1) calculating an x lower index, a y lower index, and a z lower index for each of said rays,
  (c2) determining an entrance point value from the maximum of said x lower index, said y lower index, said z lower index, and zero for each of said rays,
  (c3) converting said entrance point value for each of said rays to said entrance point for each of said rays, wherein said entrance point has an (x,y,z) coordinate in source space, comprising the steps of
    (c3a) determining an exit point value from the minimum of said x upper index, said y upper index, and said z upper index for each of said rays, and
    (c3b) clipping each of said rays when said entrance point value for each of said rays is greater than said exit point value for each of said rays, and
  (c4) passing said (x,y,z) coordinate of said entrance point for each of said rays to said volume rendering system;
(d) clipping a front portion of said plurality of sample points on each of said rays, wherein said front portion of said plurality of sample points on each of said rays lies outside of a volume data set and between said image plane and said entrance point; and
(e) processing, through a volume rendering system, a back portion of said plurality of sample points on each of said rays, wherein said back portion of said plurality of sample points on each of said rays lies beyond said entrance point on each of said rays in a direction away from said image plane.

9. A volumetric pre-clipping method for minimizing sample points processed through a volume rendering system for rendering a volume data set on a 2D graphics display of a computer system, said method comprising the steps of:
(a) determining an image plane in a source space, said image plane having a plurality of pixels;
(b) casting a ray from each of said plurality of pixels, wherein each said ray has a plurality of sample points, to create a plurality of rays, comprising the steps of
  (b1) projecting said volume data set onto said image plane to create a projection of said volume data set on said image plane, and
  (b2) clipping all of said plurality of rays that are cast from pixels that are located outside of said projection of said volume data set on said image plane, comprising the steps of
    (b1a) converting each of the bounding vertices of said volume data set to homogeneous coordinates,
    (b1b) transforming each of said bounding vertices of said volume data set from said source space containing said volume data set to a view space by multiplying each of said homogeneous coordinates of each of said bounding vertices by an orthographic transformation matrix, yielding transformed bounding vertices in said view space,
    (b1c) determining a view vector in said view space,
    (b1d) projecting each of said transformed bounding vertices onto a view plane in said view space through a plurality of rays parallel to said view vector, wherein one of each of said plurality of rays passes through one of each of said transformed bounding vertices, and further wherein said view plane has a plurality of pixels,
    (b1e) transforming said view vector from said view space to said source space by multiplying said view vector by an inverse orthoaraphic transformation matrix yielding a transformed view vector in said source space, and
    (b1f) transforming said plurality of pixels on said view plane in said view space to said image plane in said source space by multiplying each of said plurality of pixels by said inverse orthoaraphic transformation matrix yielding a transformed plurality of pixels in said source space, wherein said projection of said volume data set on said image plane is created;
(c) calculating an exit point on each of said rays;
(d) clipping a back portion of said plurality of sample points on each of said rays, wherein said back portion of said plurality of sample points on each of said rays lies outside of a volume data set and beyond said exit point on each of said rays in a direction away from said image plane; and
(e) processing, through a volume rendering system, a front portion of said plurality of sample points on each of said rays, wherein said front portion of said plurality of sample points on each of said rays lies between said image plane and said exit point.

10. A volumetric pre-clipping method for minimizing sample points processed through a volume rendering system for rendering a volume data set on a 2D graphics display of a computer system, said method comprising the steps of:
(a) determining an image plane in a source space, said image plane having a plurality of pixels;
(b) casting a ray from each of said plurality of pixels, wherein each said ray has a plurality of sample points, to create a plurality of rays, comprising the steps of
  (b1) projecting said volume data set onto said image plane to create a projection of said volume data set on said image plane, comprising the steps of
    (b1a) converting each of the bounding vertices of said volume data set to homogeneous coordinates,
    (b1b) determining a distance value from an eye point and said image plane,
    (b1c) multiplying an orthographic matrix by a perspective matrix to yield a combined matrix,
    (b1d) transforming each of said bounding vertices of said volume data set from said source space containing said volume data set to a view space by multiplying each of said homogeneous coordinates of each of said bounding vertices by said combined matrix, yielding transformed bounding vertices,
    (b1e) projecting said transformed bounding vertices onto a view plane in said view space through a plurality of rays emanating from said eye point, wherein one of each of said plurality of rays passes through one of each of said transformed bounding vertices, and further wherein said view plane has a plurality of pixels,
    (b1f) transforming each of said plurality of rays from said view space to said source space by multiplying each of said plurality of rays by an inverse combined matrix yielding a transformed plurality of rays in said source space, and
    (b1g) transforming said plurality of pixels on said view plane in said view space to said image plane in said source space by multiplying each of said plurality of pixels by said inverse combined matrix yielding a transformed plurality of pixels in said source space, wherein said projection of said volume data set on said image plane is created, and (b2) clipping all of said plurality of rays that are cast from pixels that are located outside of said projection of said volume data set on said image plane, (c) calculating an exit point on each of said rays;

(d) clipping a back portion of said plurality of sample points on each of said rays, wherein said back portion of said plurality of sample points on each of said rays lies outside of a volume data set and beyond said exit point on each of said rays in a direction away from said image plane; and (e) processing, through a volume rendering system, a front portion of said plurality of sample points on each of said rays, wherein said front portion of said plurality of sample points on each of said rays lies between said image plane and said exit point.

11. A volumetric pre-clipping method for minimizing sample points processed through a volume rendering system for rendering a volume data set on a 2D graphics display of a computer system, said method comprising the steps of:

(a) determining an image plane in a source space, said image plane having a plurality of pixels;

(b) casting a ray from each of said plurality of pixels, wherein each said ray has a plurality of sample points, to create a plurality of rays;

(c) calculating an exit point on each of said rays, comprising the steps of (c1) calculating an x upper index, a y upper index, and a z upper index for each of said rays, (c1a) calculating an x lower index, a y lower index, and a z lower index for each of said rays, (c1b) determining a delta x value, a delta y value, and a delta z value for each of said rays, (c1c) swapping said x lower index with said x upper index for each of said rays when said delta x value for each of said rays is less than zero, (c1d) swapping said y lower index with said y upper index for each of said rays when said delta y value for each of said rays is less than zero, (c1e) swapping said z lower index with said z upper index for each of said rays when said delta z value for each of said rays is less than zero, (c1f) assigning x lower to zero and assigning x upper to a large integer for each of said rays when said delta x value for each of said rays is equal to zero and said ray is potentially located inside said volume data set, (c1g) assigning y lower to zero and assigning y upper to said large integer for each of said rays when said delta y value for each of said rays is equal to zero and said ray is potentially located inside said volume data set, (c1h) assigning z lower to zero and assigning z upper to said large integer for each of said rays when said delta z value for each of said rays is equal to zero and said ray is potentially located inside said volume data set, (c1i) assigning x lower to said large integer and assigning x upper to zero for each of said rays when said delta x value for each of said rays is equal to zero and said ray is located outside said volume data set, (c1j) assigning y lower to said large integer and assigning y upper to zero for each of said rays when said delta y value for each of said rays is equal to zero and said ray is located outside said volume data set, and (c1k) assigning z lower to said large integer and assigning z upper to zero for each of said rays when said delta z value for each of said rays is equal to zero and said ray is located outside said volume data set, (c2) determining an exit point value from the minimum of said x upper index, said y upper index, and said z upper index for each of said rays, (c3) converting said exit point value for each of said rays to said exit point for each of said rays, wherein said exit point has an (x,y,z) coordinate in source space, and (c4) passing said (x,y,z) coordinate of said exit point for each of said rays to said volume rendering system;

(d) clipping a back portion of said plurality of sample points on each of said rays, wherein said back portion of said plurality of sample points on each of said rays lies outside of a volume data set and beyond said exit point on each of said rays in a direction away from said image plane; and (e) processing, through a volume rendering system, a front portion of said plurality of sample points on each of said rays, wherein said front portion of said plurality of sample points on each of said rays lies between said image plane and said exit point.

12. A volumetric pre-clipping method for minimizing sample points processed through a volume rendering system for rendering a volume data set on a 2D graphics display of a computer system, said method comprising the steps of:

(a) determining an image plane in a source space, said image plane having a plurality of pixels;

(b) casting a ray from each of said plurality of pixels, wherein each said ray has a plurality of sample points, to create a plurality of rays;

(c) calculating an exit point on each of said rays, comprising the steps of (c1) calculating an x upper index, a y upper index, and a z upper index for each of said rays, (c2) determining an exit point value from the minimum of said x upper index, said y upper index, and said z upper index for each of said rays, (c3) converting said exit point value for each of said rays to said exit point for each of said rays, wherein said exit point has an (x,y,z) coordinate in source space, comprising the steps of (c3a) determining an entrance point value from the maximum of said x lower index, said y lower index, said z lower index, and zero for each of said rays, and (c3b) clipping each of said rays when said entrance point value for each of said rays is greater than said exit point value for each of said rays, and (c4) passing said (x,y,z) coordinate of said exit point for each of said rays to said volume rendering system;

(d) clipping a back portion of said plurality of sample points on each of said rays, wherein said back portion of said plurality of sample points on each of said rays lies outside of a volume data set and beyond said exit point on each of said rays in a direction away from said image plane; and (e) processing, through a volume rendering system, a front portion of said plurality of sample points on each of said rays, wherein said front portion of said plurality of sample points on each of said rays lies between said image plane and said exit point.

* * * * *

UNITED STATES PATENT AND TRADEMARK OFFICE
CERTIFICATE OF CORRECTION

PATENT NO. : 6,072,497
DATED : June 6, 2000
INVENTOR(S) : Barthold Lichtenbelt et al.

It is certified that error appears in the above-identified patent and that said Letters Patent is hereby corrected as shown below:

<u>Column 9,</u>
Lines 31 and 32, delete "xlower index and xupper index" and insert therefor
-- xlower_index and xupper_index --

<u>Column 21,</u>
Line 67, "inverse orthoaraphic" and insert therefor -- inverse orthographic --

<u>Column 22,</u>
Line 6, delete "inverse orthoaraphic" and insert therefor -- inverse orthographic --

Signed and Sealed this

Fourth Day of June, 2002

*Attest:*

JAMES E. ROGAN
*Attesting Officer*  *Director of the United States Patent and Trademark Office*